E. VAHLE.
TURRET LATHE.
APPLICATION FILED MAR. 13, 1903.
1,041,203.
Patented Oct. 15, 1912.
8 SHEETS—SHEET 1.

Figure 1:
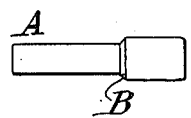

FIG. 1.ª 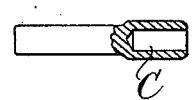   FIG. 2.ª 
FIG. 1.ᵇ 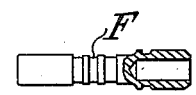   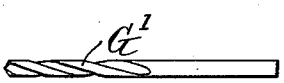 FIG. 2.ᵇ
FIG. 1.ᶜ 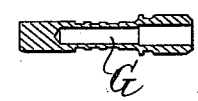   FIG. 2.ᶜ
FIG. 1.ᵈ 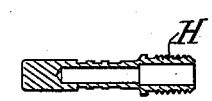   FIG. 2.ᵈ 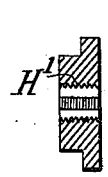
FIG. 1.ᵉ    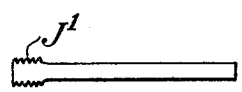 FIG. 2.ᵉ
FIG. 1.ᶠ 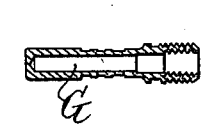   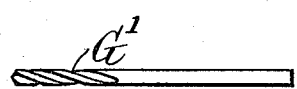 FIG. 2.ᶠ
FIG. 1.ᵍ    FIG. 2.ᵍ 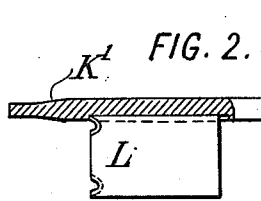
WITNESSES:
Fred White
René Bruine
INVENTOR:
Ernest Vahle,
By Attorneys,

E. VAHLE.
TURRET LATHE.
APPLICATION FILED MAR. 13, 1903.
1,041,203.
Patented Oct. 15, 1912.
8 SHEETS—SHEET 2.
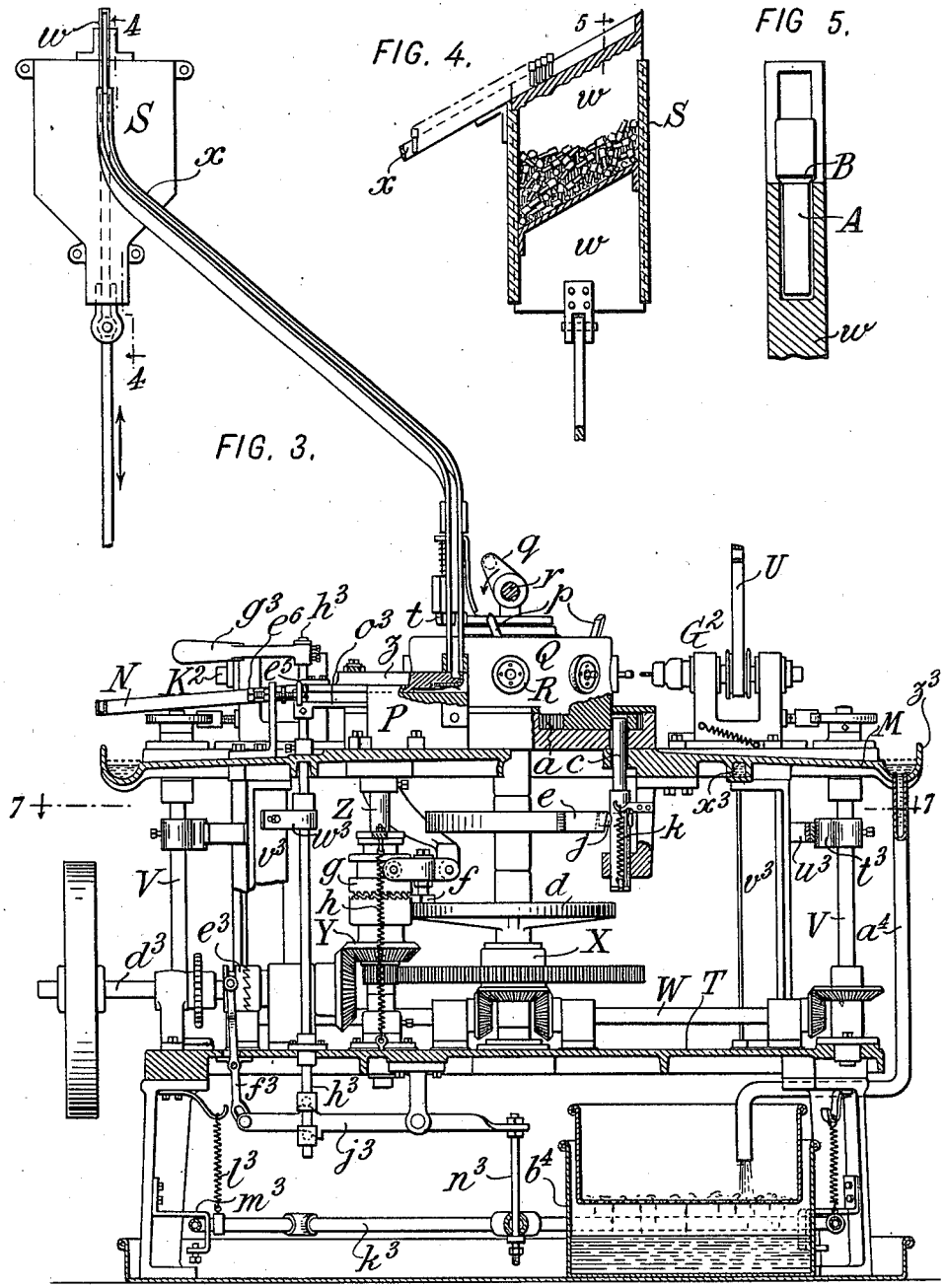

E. VAHLE.
TURRET LATHE.
APPLICATION FILED MAR. 13, 1903.

1,041,203.

Patented Oct. 15, 1912.
8 SHEETS—SHEET 3.

WITNESSES:
Fred White
René Bruine

INVENTOR:
Ernest Vahle,

By Attorneys,

E. VAHLE.
TURRET LATHE.
APPLICATION FILED MAR. 13, 1903.

1,041,203.

Patented Oct. 15, 1912
8 SHEETS—SHEET 4.

WITNESSES:
Fred White
René Bruine

INVENTOR
Ernest Vahle,

By Attorneys,

E. VAHLE.
TURRET LATHE.
APPLICATION FILED MAR. 13, 1903.
1,041,203.
Patented Oct. 15, 1912.
8 SHEETS—SHEET 5.
FIG. 9.
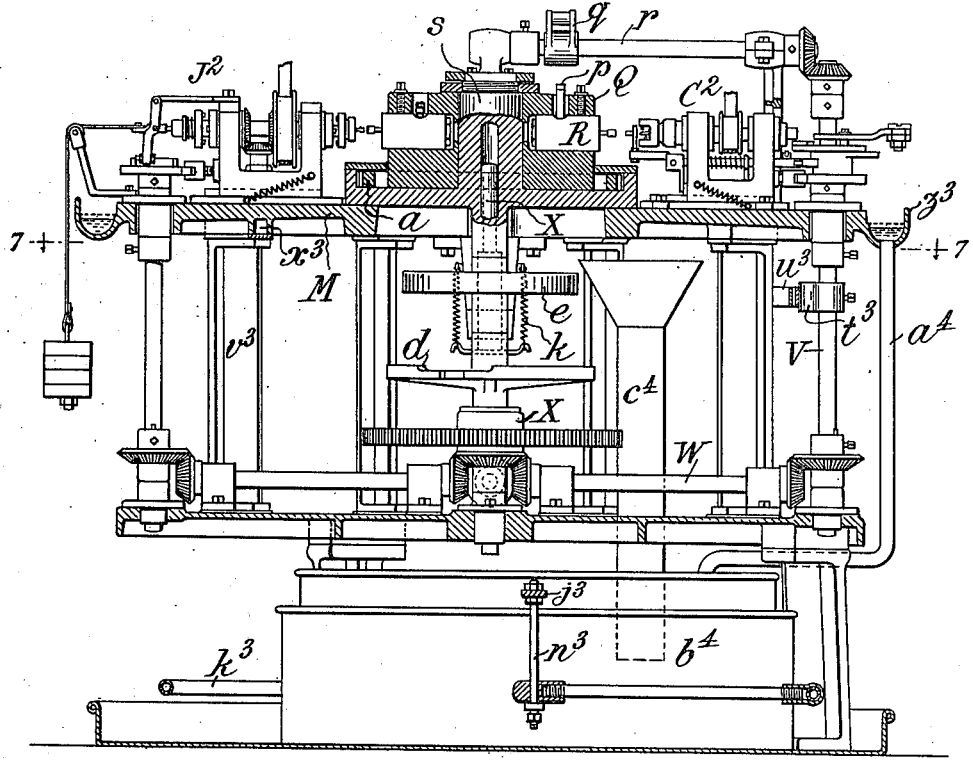
FIG. 11.
FIG. 10.
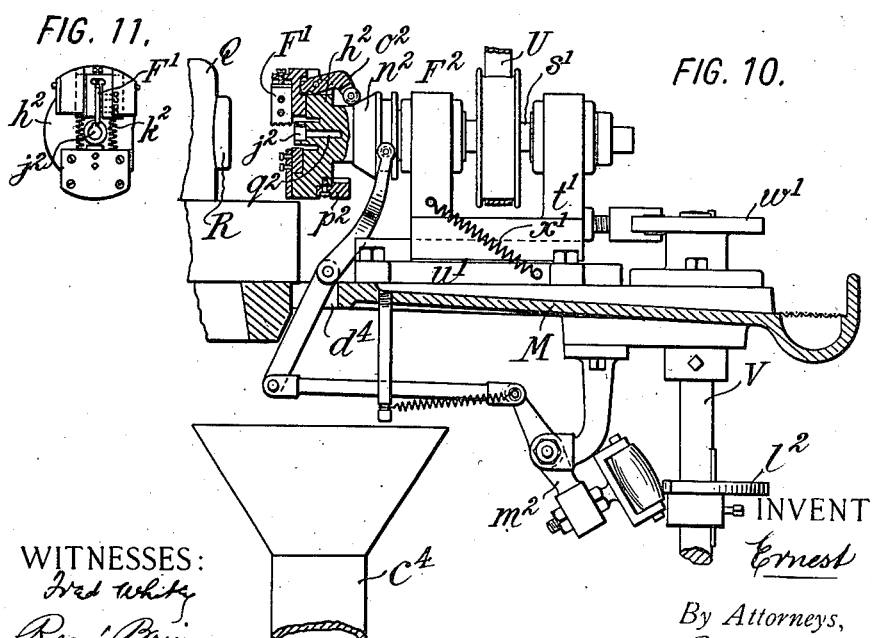
WITNESSES:
INVENTOR:
Ernest Vahle,
By Attorneys,

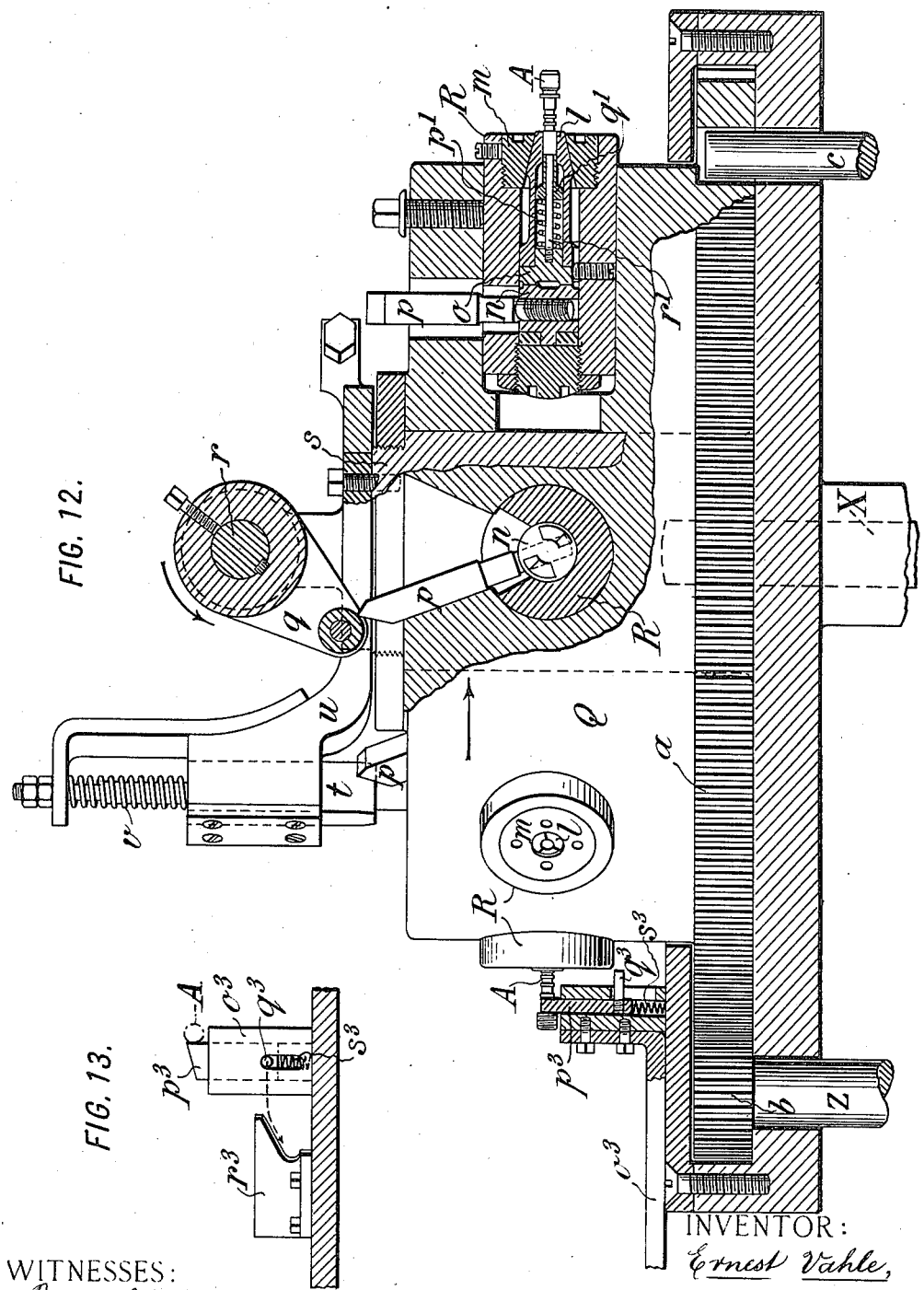

E. VAHLE.
TURRET LATHE.
APPLICATION FILED MAR. 13, 1903.
1,041,203.
Patented Oct. 15, 1912.
8 SHEETS—SHEET 7.
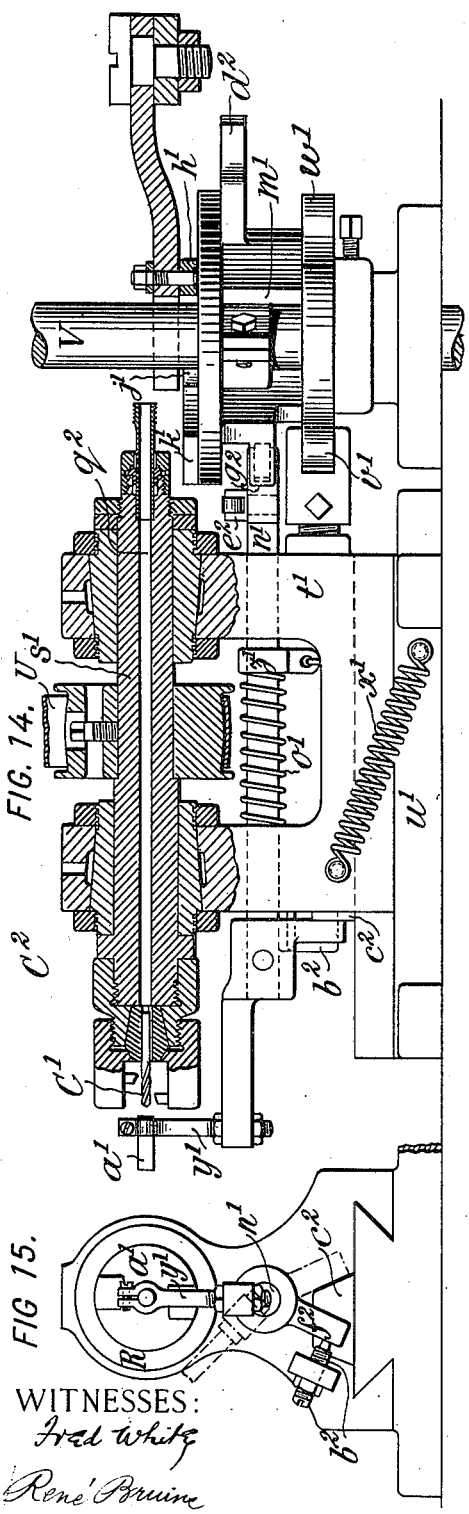
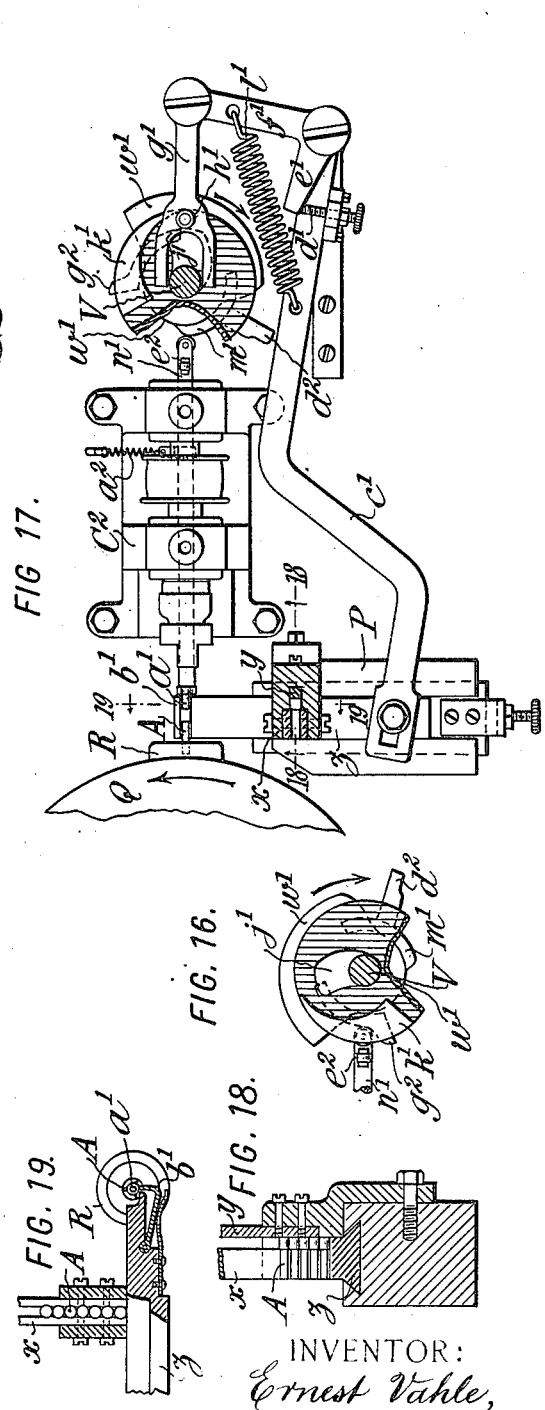
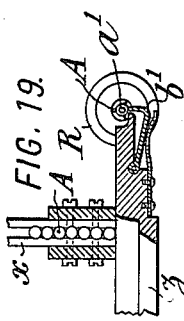
WITNESSES:
Fred White
René Bruine
INVENTOR:
Ernest Vahle,
By Attorneys,
Arthur C. Dreser & Co.

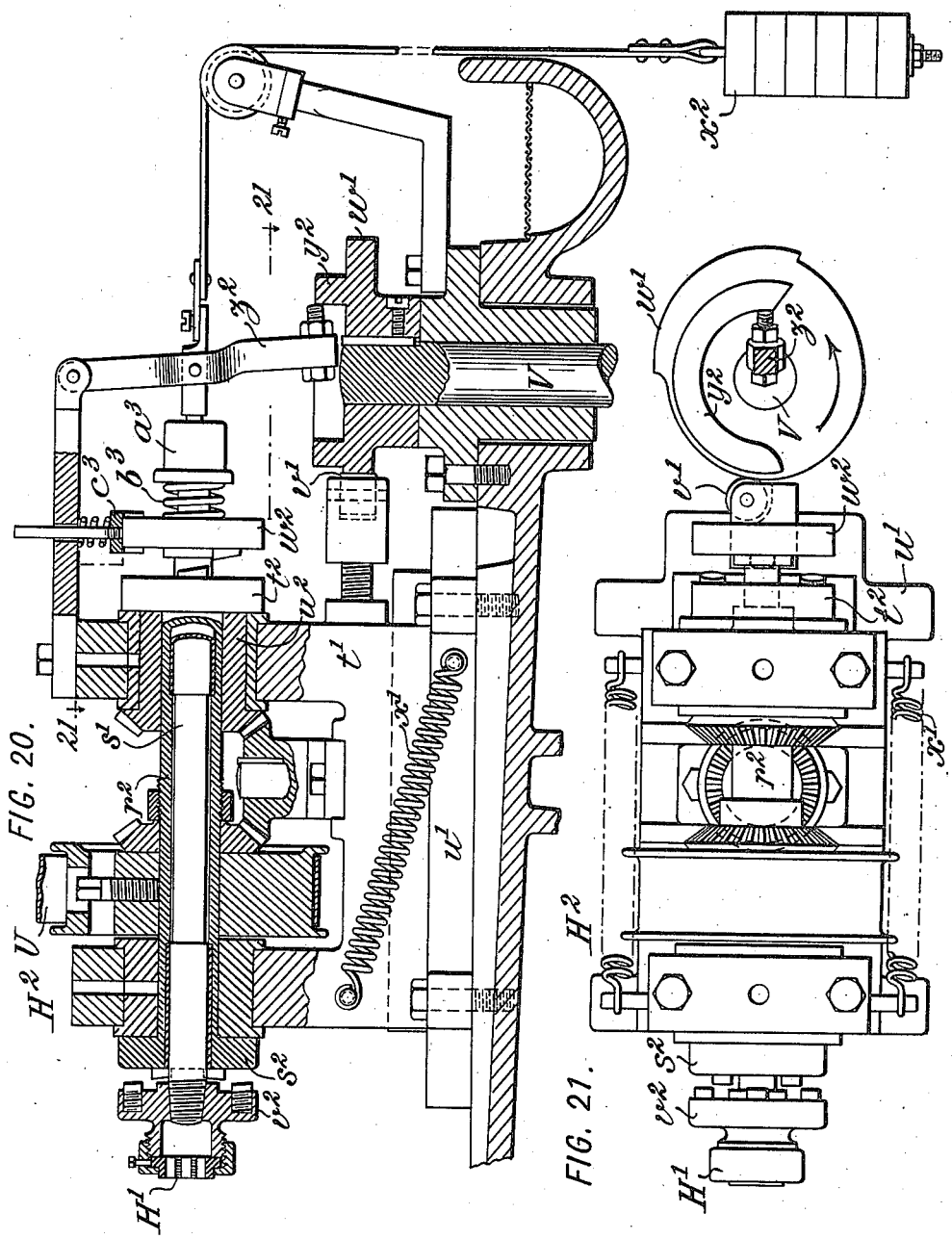

UNITED STATES PATENT OFFICE.

ERNEST VAHLE, OF WEST HOBOKEN, NEW JERSEY, ASSIGNOR, BY MESNE ASSIGNMENTS, TO A. SCHRADER'S SON, INCORPORATED, OF NEW YORK, N. Y., A CORPORATION OF NEW YORK.

TURRET-LATHE.

1,041,203.  Specification of Letters Patent.  Patented Oct. 15, 1912.

Application filed March 13, 1903. Serial No. 147,612.

*To all whom it may concern:*

Be it known that I, ERNEST VAHLE, a citizen of the United States, residing in West Hoboken, in the county of Hudson and State of New Jersey, have invented certain new and useful Improvements in Turret-Lathes, of which the following is a specification.

My invention aims to provide an improved turret lathe and especially such a lathe adapted to the manufacture of a part of a tire valve. In the operation of such a machine it is necessary to use a considerable number of tools acting in succession on the blank, and my invention provides a very convenient and compact arrangement of the tools, the work holder and the operating mechanism.

My invention provides various advantages specified in detail hereinafter.

The accompanying drawings illustrate the invention as applied to the production of parts of tire valves.

Figure 6:
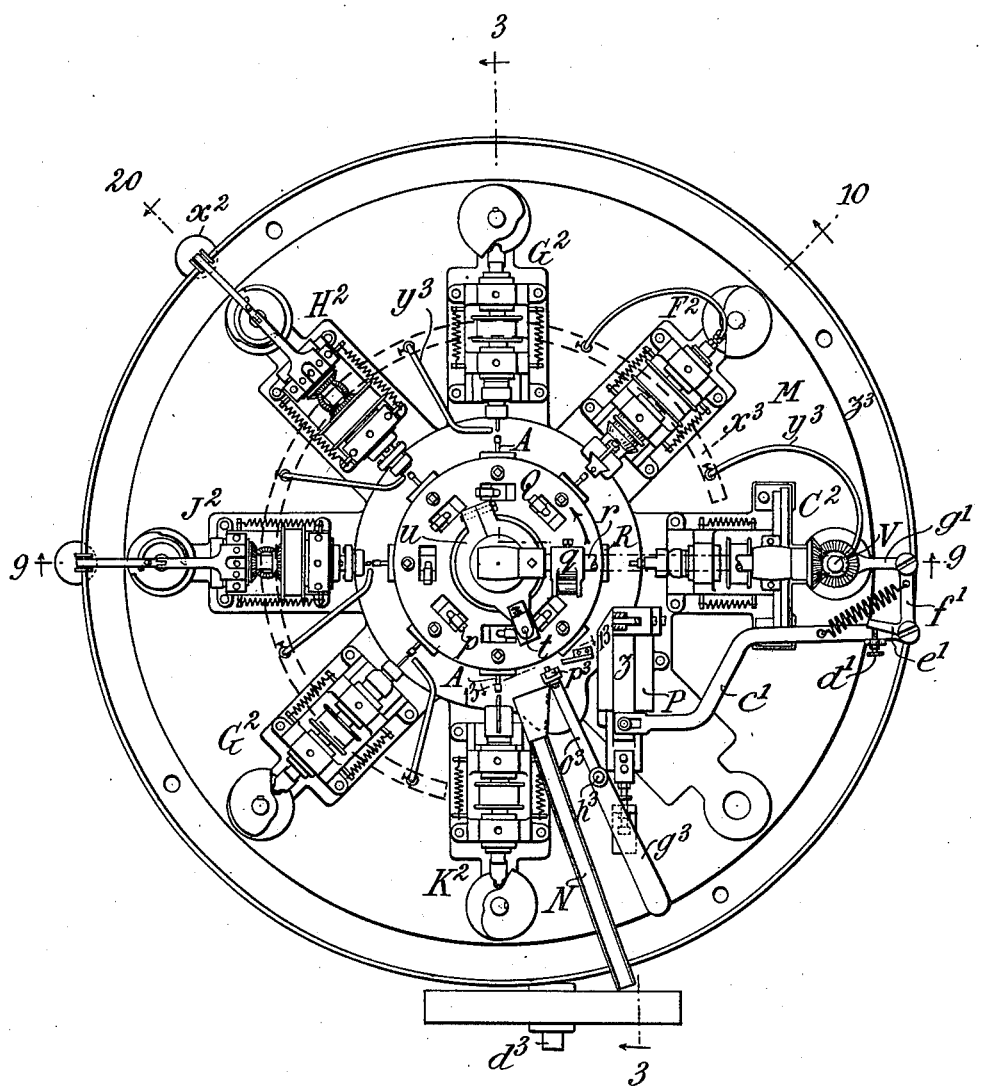
Figure 7:
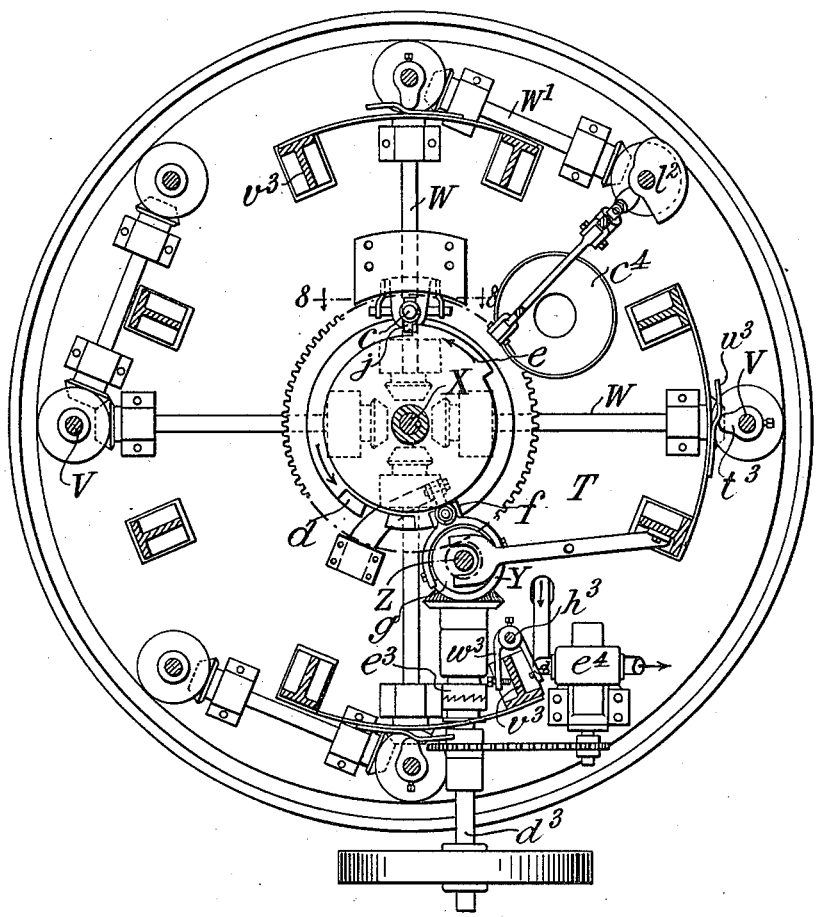
Figure 8:
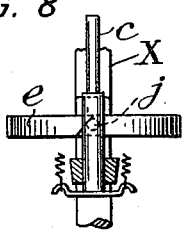

Figures 1, 1$^a$ to 1$^g$ illustrate an original blank and the forms to which it is successively reduced in the machine. Figs. 2$^a$ to 2$^g$ illustrate the corresponding tools for working the metal. The remaining figures illustrate in detail a machine embodying the invention. Fig. 3 is an elevation of the complete machine partly in section approximately on the line 3 3 of Fig. 6, omitting the blanks being fed thereto. Fig. 4 is a section of the magazine from which the blanks are fed to the machine, being a section on the line 4 4 of Fig. 3. Fig. 5 is a section of the lifting device in the magazine on the line 5 5 of Fig. 4, showing one blank in place. Fig. 6 is a plan of the machine, omitting the magazine and connecting channel. Fig. 7 is a horizontal section approximately on the line 7 7 of Fig. 3. Fig. 8 is a view of a detail approximately on the line 8 8 of Fig. 7. Fig. 9 is a vertical section approximately on the line 9 9 of Fig. 6. Fig. 10 is a vertical section of one of the tools and operating mechanism approximately on the line 10 of Fig. 6. Fig. 11 is an end view of the tool holder of Fig. 10. Fig. 12 is a view of the central turret partly in section approximately on the line 3 3 of Fig. 6. Fig. 13 is a view of the mechanism for stopping the machine in case the completed article is not properly ejected, being a view approximately on the line 13 13 of Fig. 6. Fig. 14 is a view of the first tool partly in section on the line 9 9 of Fig. 6. Fig. 15 is an end view of Fig. 14. Fig. 16 is a plan illustrating the cams of Fig. 14. Fig. 17 is a plan of Fig. 14 with the cams in another position. Figs. 18 and 19 are sections of the feeding mechanism taken on the lines 18 18 and 19 19 respectively of Fig. 17. Fig. 20 is a view partly in section on the line 20 of Fig. 6, of one of the thread cutting tools. Fig. 21 is a plan of the same.

My machine comprises a central rotating turret having a series of work-holding chucks into which the blanks are introduced in a radial position in succession as the turret rotates, the turret being surrounded by a stationary table carrying a series of tools each of which advances toward the work as the latter is presented to it by the rotating turret and then rotates to cut the metal to the desired shape.

The machine illustrated is especially designed to receive a blank A (Fig. 1) consisting of a solid cylindrical rod or "rivet" having a shoulder B. The small end of the rivet is held in a chuck and it is moved step by step to present it to the successive tools. First it receives a comparatively large bore C from a boring tool C', and is shaved smooth on the outside and beveled at its edge by means of cutting tools D and E; at the next operation it receives a number of outer grooves F by means of a suitable cutting tool F'; then it receives a second smaller bore G from a borer G'; outer screw threads H are then cut by a die H'; and inner threads J by a tap J'; the bore G is then extended by a second boring tool G$^2$, the formation of this long bore G being divided into two periods of time so as to not delay the various other operations by reason of the extra time which would be required to form a long bore at one operation; thereupon a conical bore K is formed connecting the larger bore C and the smaller G, by means of a cutter K', and the outer edge is smoothed and rounded by means of a cutting tool L provided with two cutters to permit ready substitution of a sharp cutter as soon as the working cutter becomes dull.

The arrangement of the several tools, together with the operating mechanisms therefor, is shown in Fig. 6, the reference letters C$^2$ F$^2$ G$^2$ H$^2$ J$^2$ G$^2$ and K$^2$ being used to indicate the corresponding tools and operating mechanism as a whole. These tools are arranged upon the stationary table M in the positions indicated, the space between the last and the first tools being occupied by the ejecting chute N, the feeder P and the other devices hereinafter referred to. The table M is horizontal as shown, and the turret Q at the center rotates on its vertical axis. The turret carries a series of chucks R which when opposite the tool $C^2$ receive the blank and by successive steps present it to each of the tools in succession. Upon leaving the last tool $K^2$ the blank A is forcibly ejected into the chute N and off to one side of the machine. The blanks are conducted to the feeder P from a magazine S (Fig. 3). This figure also shows the arrangement of the machinery for rotating the turret and for controlling the radial movement of the tools toward and from the work between the table M and a base T. The rotation of the several tools on their axes is secured by means of a series of belts U running to suitable overhead shafting, which belts avoid any positive connection between the tools in their rotating movement, the slip of the belt allowing each tool to go at its own speed according to the work being done; while the movement of the several tools toward and from the work is synchronized, such movement being obtained from a series of vertical shafts V arranged at the outside ends of the tools and driven from transverse shafts W, W' (Fig. 7) which in turn are driven from a main central shaft X. The shaft X is driven from a constantly rotating sleeve Y which is loose on the turret-rotating shaft Z and adapted to be clutched thereto at suitable intervals. Suitable provision is made for supplying oil to the several tools and carrying it off.

The turret, as shown in Figs. 3 and 12, is supported on a raised portion of the table M and is provided at its lower edge with a large gear $a$ which is in engagement with the pinion $b$ at the top of the shaft Z. It is also provided with a series of apertures into which a locking bolt $c$ enters to hold the turret exactly in position to register with the tools. It is understood that the turret is held stationary during the entire time that the tools are in engagement with the work. This time is determined by cams at the upper ends of the several shafts V, which, as stated, are driven from the central shaft X. This shaft X carries cams $e$ and $d$ for withdrawing the locking bolt $c$ and clutching the shaft Z to the constantly rotating sleeve Y at proper intervals. The cam $d$ is illustrated best in Figs. 7 and 9, being provided with a depressed portion which, acting in conjunction with the adjustable pin $f$ (Fig. 3), connected as shown to the clutch block $g$, permits the latter to be pulled down by its weight and by the spring $h$ and to be held down for a sufficient length of time to turn the turret one-eighth of a revolution. The cam $e$ is shown in detail in Fig. 8 and acts just before the cam $d$ to engage a pin $j$ on the stop pin $c$ and pull the latter down out of engagement with the turret. As soon as the cam $e$ turns sufficiently for its projecting portion to pass the pin $j$, the pin $c$ is pulled up again by means of springs $k$ and holds the turret accurately fixed in position until the next movement.

Each of the chucks is provided with an arm arranged to oscillate and thereby to open and close the jaws of the chuck. At the end of the series of operations this arm engages a stop in its path which swings it backward so as to open the chuck, whereupon the work is ejected. The chuck remains open until a new blank is inserted, whereupon the chuck-operating arm is struck by another arm moving in the same direction so as to swing it forward and effect the closure of the chuck on the blank. Means are provided carried by the chuck for automatically ejecting the work upon opening the jaws. As embodied in the present machine the chuck and operating mechanisms therefor are best illustrated in Figs. 6 and 12. The usual split spring jaws $l$ are squeezed together by being moved outwardly through the tapered ring $m$, and upon being released force themselves back into the ring and separate so as to release the work. For closing the jaws I provide a pivoted cam plate $n$ on which is a pair of cam faces bearing against similar or suitable faces on a rear plate $o$ to which the jaws $l$ are attached. A chuck-operating arm $p$ projects out of the cam plate $n$ and a slight distance above the top of the turret. As this arm is moved forward (see the arrow Fig. 12) the jaws are forced forward and together, this movement taking place simultaneously with or immediately after the insertion of the blank. For obtaining this forward movement of the chuck-operating arm $p$ I provide an arm $q$ which is carried on a shaft $r$ (Figs. 6 and 9) supported in bearings at its outer end upon a bracket projecting up from the table and at its inner end upon a vertical boss $s$ extending up from the table through the center of the turret. The shaft $r$ is rotated continuously by a bevel gear connection with the shaft V at its outer end. This action takes place while the turret is stationary, and any arm moving in the forward direction might be substituted in place of the special arm $q$ shown. In order to swing the arm $p$ back again after the series of operations, a stop $t$ is provided which is substantially fixed, being carried in a bracket $u$ attached on the central fixed boss $s$. The stop $t$ ordinarily stands directly in the path of the arm $p$, and as the turret turns the arm engages the stop and is turned backward. The stop $t$ is arranged to move upward out of the way of the arm $p$ as the latter forces its way past, a spring $v$ serving to hold the stop down with sufficient force to effect the turning of the chuck-operating arm before it rises.

Within each of the chucks is illustrated a spring $p'$ which is compressed by the introduction of a blank A and which is held compressed as long as the jaws of the chuck hold the blank A in position, but which upon the opening of the jaws forcibly ejects the blank. Preferably the spring bears against the blank through the intermediation of a ring $q'$, and a pin $r'$ is provided for limiting the inward position of the blank A and for guiding the ring $q'$. The mechanism is so timed that at the moment of release of the blank from the jaws of the chuck the blank will be opposite the discharge chute N. Consequently the finished articles are expelled one after another forcibly through the chute N to a point outside the machine.

The magazine and mechanism for delivering the blanks continuously and in proper position to the feeding mechanism is illustrated in Figs. 3, 4 and 5. The box S constituting the receptacle tapers from two sides toward the center, as shown in Fig. 3, and also extends obliquely downward from its rear to its front, as shown in Fig. 4. A member such for example as the slide $w$ reciprocates vertically in the receptacle, and is provided at its upper edge with a groove, as shown, which engages the shoulders B of the blanks in the box when the upper edge of the plate or slide is depressed. The smaller but heavier portions of the blanks swing down into the groove in the manner illustrated. The groove and the upper edge of the slide are oblique, so that as the slide is lifted to its highest position (Fig. 4) such of the blanks as have been caught slide down to the lower end of the groove and thence out into the trough $x$ whose upper end registers with the lower end of the groove in the slide $w$ and which consists merely of two parallel plates. In the trough $x$ the blanks are held by their shoulders the same as in the slide until near the lower end where they are gradually turned to a horizontal position, as shown in Figs. 18 and 19. In this lower portion of the trough a guard plate $y$ is arranged opposite the larger ends of the blanks to prevent them falling out and constituting with the sides $x$ a magazine. The blanks are taken one by one from the lower end of the trough $x$ by means of a transverse slide $z$ provided with a groove at one end. When the slide $z$ is retracted (Fig. 6) the groove lies immediately under the vertical line of blanks and the lower blank drops into the groove. The slide is then advanced until the blank is opposite the center of the chuck R. (Fig. 17). Thereupon a pin $a'$ is projected against the blank and forces it into the chuck, and is later withdrawn. The slide $z$ is almost immediately retracted, and in order to permit it to pass the head of the blank A the outer end of the slide is composed of a yielding plate $b'$ which is automatically depressed by the rivet so that it passes under the latter, as shown in Fig. 19. The movement of the slide $z$ is produced by a swinging arm $c'$ pivoted at its outer end and moved positively in the retracting direction by the engagement of an adjustable stop $d'$ thereon with an arm $e'$ on a bell crank lever the other arm $f'$ of which carries a forked link $g'$ straddling the shaft V and carrying a roller $h'$ which is alternately forced outward by a cam $j'$ and inward by a cam $k'$, both on a plate rotated with the shaft V. The cam $k'$ effects an inward movement of the roller $h'$, and by the action of the arm $e'$ on the stop $d'$ effects a retractive movement of the slide $z$. The cam $j'$ causes an outward movement of the roller $h'$ and the movement is transmitted yieldingly through the spring $l'$ to produce a forward movement of the slide $z$. Lower down on the shaft V is a cam $m'$ which substantially simultaneously with the completed action of the cam $j'$ on the slide $z$ acts on a rod $n'$ to push it forward and with it the pin $a'$ previously referred to, a spring $o'$ serving to retract the rod $n'$ after the cam has passed. The cam $m'$ holds the pin $a'$ forward against the blank while the slide $z$ is being retracted by the cam $k'$, thus holding the blank firmly in the chuck. Stops $e^5$ and $e^6$ (Fig. 3) limit the forward and backward movement of the slide. The pushing pin $a'$ has also certain other movements consequent upon its position in line with the tool C' and which I will describe in connection with the operation of this tool.

The central shaft $s'$ of the tool is rotated by means of a belt U as shown and is carried in bearings on a slide $t'$ sliding on a fixed base $u'$. The slide $t'$ carries at its rear a cam roller $v'$ in engagement with a cam $w'$ carried by the shaft V. This cam at the proper time advances the slide $t'$ until the tools properly engage the blank and perform their work. A pair of springs $x'$ on opposite sides retract the slide as the cam $w'$ permits. The pin $a'$ first stands directly in line with the center of the shaft $s'$ and pushes the blank into the chuck. Then it swings to the side so that in the further advance it will not strike the projecting portion of the chuck R, the lateral position being indicated in dotted lines in Fig. 15. This pin is carried on an arm $y'$ of the shaft $n'$ previously referred to, which shaft is provided with a sleeve $z'$ to the lower end of which is attached a spring $a^2$ (Fig. 17) which tends always to pull the shaft around until the arm $y'$ is in an upright position. At the front of the slide $t'$ are a pair of stops $b^2$ and $c^2$ which determine the angular position of the arm $y'$. Starting with the parts in the position shown in full lines in Fig. 15, the shaft $n'$ is engaged by the cam $m'$ as explained and pushed forward slightly. A little later a second cam $d^2$ in one with the cam $m'$ engages an arm $e^2$ on the shaft $n'$ so as to turn the shaft to the angular position indicated in dotted lines in Fig. 15. Thereupon the spring $o'$ pulls the shaft back and the depending arm $f^2$ is engaged by the stop $c^2$ on the face of the slide $t'$ to prevent a return of the shaft to its former angular position. The lowest cam $w'$ then pushes the slide forward and the continuous rotation of the tool shaft shapes the blank as explained. Shortly after the action of the cam $w'$ has ceased and the tool has been withdrawn by the springs $x'$ another cam $g^2$ in the plane of the shaft $n'$ pressed the latter forward and the spring $a^2$ simultaneously turns it to its original position, the adjustable stop $b^2$ acting against the lower arm $f^2$ to determine this position accurately. The parts are then ready for another operation. $q^2$ is a central passage through which oil may be fed to the tool.

The next tool and its appurtenances, $F^2$, are indicated in Fig. 10. The tool shaft $s'$, as in the previous case, is driven by a belt U and is carried in a slide $t'$ which travels upon a fixed plate $u'$, being moved forward by a cam $w'$ and backward by springs $x'$. The tool proper $F'$ besides its forward movement and its rotation with the shaft $s'$ receives first an outward and then a gradual inward movement to form the grooves. The tool-holding head $h^2$ has a central cylindrical extension $j^2$ to form a rest for the head of the blank to enable it to resist the lateral pressure of the tool $F'$. The tool $F'$ is normally held out from the center by means of springs $k^2$ (Fig. 11). When the slide $T'$ has been sufficiently advanced by the cam $w'$ a second cam $l^2$ on the same shaft V engages and swings a lever $m^2$, which by the connection shown presses forward a conical cam $n^2$ which engages the rear end of a lever $o^2$ and moves the cutter $F'$ gradually against the work. A counterweight $p^2$ is preferably provided to insure even running. $q^2$ is an oil passage.

The mechanism for controlling the movements of the boring tools $G'$ is similar to that shown in Fig. 14, omitting the parts thereof which control the movement of the feeding pin $a'$.

The mechanism $H^2$ including the outside thread-cutting die and its operating mechanism, is shown in Figs. 20 and 21. Provision has to be made in this case for turning the die $H'$ in first one and then the other direction. $r^2$ is a central constantly-rotating shaft, hollow in this case, carried in the slide $t'$ which slides on the bed $u'$ and is moved forward and back by means of the cam $w'$ and springs $x'$. At one end of the slide $t'$ is a clutch head $s^2$ carried by the hollow shaft $r^2$, and at the opposite end is a clutch head $t^2$ carried by the sleeve $u^2$ which is rotated in a contrary direction to the hollow shaft $r^2$ by the bevel gears shown and well understood in this type of machine. The tool shaft $s'$ is provided with corresponding clutch heads $v^2$ and $w^2$. As the slide is moved forward, the tool shaft $s'$ being held back by means of a weight $x^2$ attached to its rear end, the clutch head $s^2$ engages the corresponding clutch head $v^2$ and rotates the die in say the right-hand direction, the forward movement and rotation being continued until the thread is complete. Thereupon the rear end of the cam $w'$ passes the cam roller and the springs $x'$ come into play. Simultaneously a second cam $y^2$ engages the end of a lever $z^2$ and presses forward a sleeve $a^3$, which, by a yielding pressure due to the spring $b^3$, presses forward the clutch head $w^2$ which is splined on the tool shaft. This clutch head then engages the clutch head $t^2$, which rotates the tool shaft in the opposite direction, to unscrew it from the work. A brake $c^3$ is constantly applied to the clutch head $w^2$, to prevent the too sudden starting of rotation of the same or too long-continued rotation after disengagement.

The mechanism controlling the tap $J'$ for forming the inside thread is substantially identical with that just described for controlling the die $H'$.

The mechanism for controlling the movement of the cutters $K'$ and L is substantially the same as the mechanism for controlling the movements of the tools $C'$ and $G'$.

The sleeve Y from which the various mechanisms and the turret are operated, receives its movement from a main shaft $d^3$ through a clutch $e^3$ which is operated by the movement of a lever $f^3$. The machine will ordinarily be started or stopped by a hand-lever $g^3$ projecting above the same and mounted on a shaft $h^3$ the turning of which is converted to an up or down movement of the lever $j^3$ and a corresponding movement of the lever $f^3$. The clutch may also be disconnected by means accessible from a plurality of positions, so that in case of accident it can be stopped at once. The means illustrated comprises a ring $k^3$ extending around the machine near the floor so as to be accessible from all sides of the machine, being suspended at suitable intervals by springs $l^3$ and guided and limited by brackets $m^3$. At approximately the center of this ring it connects by means of cross-bars with a rod $n^3$ depending from an end of the lever $j^3$. By pressing the foot upon this ring at any point, the central portion will be pushed down and with it the rod $n^3$, which, through the levers shown, will disconnect the clutch. This mechanism is extremely useful in case of sudden breakage or other accident when the operator is not within quick reach of the handle $g^3$.

I provide also means for stopping the machine automatically in case the finished article is not properly ejected from the chuck. As shown best for example in Figs. 6, 12 and 13, the shaft $h^3$ is provided above the table with a second arm $o^3$ provided with a member $p^3$ normally projecting into the path of the work. As the turret rotates, the work A, if it has not been properly ejected into the chute N, strikes the projection $p^3$ and swings the arm $o^3$ to turn the shaft $h^3$ in the direction to unclutch the machine. As the movement continues, the projection $p^3$ is drawn down out of the path of the work after the arm $o^3$ has been swung the necessary distance. The withdrawal of the projection $p^3$ is effected by means of a pin $q^3$ attached thereto and projecting from the front of the arm $o^3$, this pin being engaged by the oblique edge of a cam $r^3$ so as to pull down the pin against the normal upward pressure of the spring $s^3$. In starting the machine again the arm $o^3$ is swung back to its normal position, Fig. 6. An upright $v^3$ (Fig. 7) operating in connection with a pair of arms $w^3$ carried upon an intermediate portion of the shaft $h^3$, serves to limit its movement.

In order to make the machine run smoothly and slowly at the proper periods, and to stop it with the several mechanisms in proper position, one or more of the vertical shafts V may be provided with friction cams $t^3$ which engage springs $u^3$ supported upon bars extending between adjacent uprights. Such devices also prevent any shock to the tool and work as the tool slide reaches its extreme outward position and starts to return. At such time the slide acting against the cam $w'$, tends to move the shaft V in the direction of its rotation and does so move it to the extent of any lost motion in the gearing for such shaft. This would permit a quick rearward movement of the tool, and would tend to either break the latter or injure the work. By the cam $t^3$ and spring $u^3$ a brake is put upon the shaft at such time so that this sudden rearward motion of the tool is prevented.

Means for supplying oil to the various tools is provided. As illustrated, a tube or channel $x^3$ (see Figs. 3, 6 and 9) is provided on the under side of the plate M, and from this channel the oil passes through flexible tubes $y^3$ either directly to the work or through the tool and thence to the work, in the manner hereinbefore explained. The table M is inclined downwardly toward its edge, and all around the edge there is provided a gutter $z^3$ into which the oil from the various tools runs. A strainer is provided to prevent the metal from also passing into the gutter. By a number of tubes $a^4$ placed at suitable intervals the oil is conducted from the gutter into a tank $b^4$, being preferably again strained. For the mechanism $F^2$ (Fig. 10) a funnel and large tube $c^4$ receives the oil passing through the opening $d^4$ in the table, and conducts it directly to the tank $b^4$. The oil is then again drawn from the tank $b^4$ and forced into the channel $x^3$ by means of a pump $e^4$ (Fig. 7) which may be driven from the power shaft $d^3$ as shown. Thus a continual circulation of oil is maintained, and a constant and generous supply is furnished to the tools.

I claim as my invention:

1. In a lathe, in combination, a chuck, a tool in line with said chuck, a pusher in front of and in axial line with said tool, and means for operating said pusher to push a blank into said chuck and then moving said pusher aside to permit the advance of said tool.

2. In a lathe, in combination, a chuck, a tool in line with said chuck, a pusher in front of and in axial line with said tool, a shaft $n'$ carrying said pusher, a slide carrying said tool and shaft $n'$, means for giving said shaft first a forward movement to push a blank into the chuck and then an angular movement to swing said pusher out of line with the tool, and means for then advancing said tool.

3. In a lathe in combination a magazine adapted to carry a number of blanks, a reciprocating carrier for carrying said blanks one at a time from said magazine to a position registering with a chuck of the lathe, a reciprocating pusher adapted to push said blank from said carrier into the chuck in said position, an arm carried by the chuck of the lathe adapted to oscillate and to thereby open and close the jaws of the chuck, a rotating turret carrying said chuck, a second arm adapted to engage and swing said chuck operating arm forward, means for moving said second arm and a stop in the path of said chuck operating arm adapted to swing the same backward.

4. In a turret lathe, the combination with a turret and a chuck therein, of an arm carried by said chuck adapted to oscillate, means for opening and closing the jaws of the chuck upon the oscillation of said arm, means for rotating said turret, a second arm adapted to engage and swing said chuck operating arm forward, means for moving said second arm, and a stop in the path of said chuck operating arm adapted to swing the same backward.

5. In a turret lathe, the combination of a turret, means for rotating the same on a vertical axis, a series of work-holding chucks carried thereby, means for introducing blanks in a horizontal position into said chucks in succession, a stationary table surrounding said turret, a series of rotating cutting tools comprising a drill, a tap, a die, and a reamer carried by said table, separate means for advancing each of said tools toward the work as the latter is presented to them by the rotating turret, and means for rotating said tools.

6. In a turret lathe, the combination of a turret, means for rotating the same on a vertical axis, a series of work-holding chucks carried thereby, means comprising a drill, a tap, a die, and a reamer for introducing blanks in a horizontal position into said chucks in succession, a stationary table surrounding said turret, a series of tools carried upon said table, means for rotating said tools, and a series of separate cams for moving the separate tools toward and from the work as the latter is presented to them by the rotation of the turret.

7. In a turret lathe, the combination of a turret, means for rotating the same, chucks carried thereby, means for ejecting the finished work from said chucks, and means controlled by the work for automatically stopping the mechanism when the work is not ejected at a proper point.

8. In a turret lathe, the combination of a turret, means for rotating the same, chucks carried thereby, means for ejecting the finished work from said chucks, an arm in the path of said work adapted to be struck by the same when the work is not ejected at a proper point, and connections from said arm for stopping the driving mechanism when said arm is moved by the work.

9. In a turret lathe, the combination of a turret, means for rotating the same, chucks carried thereby, means for ejecting the finished work from said chucks, an arm in the path of said work adapted to be struck by the same when the work is not ejected at a proper point, connections from said arm for stopping the driving mechanism when said arm is moved by the work, and means for withdrawing said arm from the path of the work when the arm has been properly moved.

10. In a turret lathe, the combination of a turret, means for rotating the same on its vertical axis, a stationary table surrounding said turret and carrying a series of tools, said table being inclined downwardly toward its outer edge, means for supplying oil to each of said tools, and a gutter surrounding said stationary table and receiving the oil from said table after it has been used by said tools, said gutter being adapted to drain the entire table.

11. In a turret lathe, the combination of a turret, means for rotating the same on its vertical axis, a stationary table surrounding said turret and carrying a series of tools, said table being inclined downwardly toward its outer edge, means for supplying oil to each of said tools, a gutter surrounding said stationary table and receiving the oil from said table after it has been used by said tools, a tank receiving the oil from said gutter, said gutter being adapted to drain the entire table, and a pump forcing oil from said tank to each of said tools whereby a continuous circulation of the oil is maintained.

12. In combination with a turret machine having a turret rotating upon a vertical axis and a series of tools arranged around the machine, of a driving shaft, a clutch connecting said driving shaft to said series of tools, and means directly accessible from all sides of the machine for disconnecting said clutch.

13. In combination with a turret machine having a turret rotating upon a vertical axis and a series of tools arranged around the machine, of a driving shaft, a clutch connecting said driving shaft to said series of tools, and means extending substantially entirely around said machine for disconnecting said clutch.

14. In combination with a turret machine, a driving shaft, a clutch connecting said driving shaft to the operated devices, a ring $k^3$ extending around the machine and suspended at intervals by springs, and a connection from the central portion of said ring to said clutch whereby the depression of the ring at any point operates to disconnect said clutch.

15. In a machine for converting a blank or rivet into a part of a tire valve, the combination of a series of tools, means comprising a turret rotating about a vertical axis for presenting said blank to said tools in succession, and means for operating said tools, said tools comprising in succession means for drilling a hole of large diameter and shaping the edge of the rivet, means for grooving the outside of the rivet, means for drilling a hole of smaller diameter constituting an extension of the first hole, means for cutting exterior screw-threads, means for cutting interior screw-threads, a drill for extending said hole of smaller diameter, and means for rounding the edge.

16. In a turret lathe, in combination, a rotary turret having means for carrying a series of blanks, a tool for forming grooves on the outside of a blank, means for rotating said tool, means for reciprocating the tool toward and from the blank, and a positively-actuated means for effecting an inward movement of the tool relatively to the blank to cause it to bear against the blank.

17. In a turret lathe, in combination, a rotary turret having means for carrying a series of blanks, a tool for forming grooves on the outside of the blank, means for rotating said tool, means for reciprocating the tool toward and from the blank, and a socket for holding the free end of the blank.

18. In a turret lathe, in combination, a rotary turret having means for carrying a blank, a tool F' for forming grooves on the outside of a blank, means for giving said tool a rotary motion and a reciprocating motion toward and from the work, and means for giving said tool first an inward movement to bear against the blank, and then an outward movement away from the blank.

19. In a turret lathe, in combination, a rotary turret having means for carrying a blank, a tool F' for forming grooves on the outside of a blank, means for giving said tool a rotary movement and a reciprocating movement toward and from the work, and a socket $j^2$ for holding the free end of the blank.

20. In a turret lathe, in combination, a rotary turret having means for carrying a blank, a tool F' for forming grooves on the outside of a blank, means for giving said tool a rotary movement and a movement toward and from the work, means normally holding said tool outward, and means for moving said tool inward against the blank comprising a lever $o^2$, a conical cam $n^2$ and means for forcing said cam forward.

21. In a lathe, in combination, a tool shaft, a tool carried eccentrically of said shaft and adapted to be advanced and retracted transversely thereof, and a counter-weight $p^2$ carried by said shaft upon the opposite side to said tool and counterbalancing the weight of said tool.

22. In a turret machine, in combination, a stationary table, a number of tools carried thereby, a central turret rotating on a vertical axis, a series of chucks carried by said turret and adapted to be presented to each of said tools in succession, a series of vertical shafts V for controlling the movement of said tools toward and from the work, fixed springs $u^3$ and friction cams $t^3$ carried by one or more of said shafts.

In witness whereof, I have hereunto signed my name in the presence of two subscribing witnesses.

ERNEST VAHLE.

Witnesses:
HENRY P. KRAFT,
M. CHARLES SCHWEINER.